(12) United States Patent
Wang et al.

(10) Patent No.: US 8,442,109 B2
(45) Date of Patent: May 14, 2013

(54) SIGNALING OF REGION-OF-INTEREST SCALABILITY INFORMATION IN MEDIA FILES

(75) Inventors: Ye-Kui Wang, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1314 days.

(21) Appl. No.: 11/775,136

(22) Filed: Jul. 9, 2007

(65) Prior Publication Data

US 2008/0013621 A1    Jan. 17, 2008

Related U.S. Application Data (60) Provisional application No. 60/860,539, filed on Jul. 12, 2006.

(51) Int. Cl.
*H04N 7/12* (2006.01)
(52) U.S. Cl.
USPC ............ 375/240.01; 375/240.22; 375/240.18; 382/165; 382/260; 382/251
(58) Field of Classification Search ............. 375/240
See application file for complete search history.

(56) References Cited

U.S. PATENT DOCUMENTS

| | | | |
|---|---|---|---|
| 6,256,423 B1 * | 7/2001 | Krishnamurthy et al. | 382/251 |
| 6,973,128 B2 * | 12/2005 | Zhou et al. | 375/240.11 |
| 7,042,944 B2 * | 5/2006 | van der Schaar et al. | 375/240.1 |
| 7,062,096 B2 * | 6/2006 | Lin et al. | 382/232 |
| 7,535,383 B2 * | 5/2009 | Segall et al. | 341/50 |
| 7,738,552 B2 * | 6/2010 | Iler | 375/240.01 |
| 8,085,852 B2 * | 12/2011 | Liu et al. | 375/240.25 |
| 8,184,153 B2 * | 5/2012 | Kang et al. | 348/135 |
| 8,208,738 B2 * | 6/2012 | Okada et al. | 382/232 |
| 8,290,057 B2 * | 10/2012 | Ju | 375/240.22 |
| 2002/0037046 A1 * | 3/2002 | Schaar et al. | 375/240.2 |
| 2004/0006575 A1 * | 1/2004 | Visharam et al. | 707/104.1 |
| 2004/0179606 A1 * | 9/2004 | Zhou et al. | 375/240.25 |
| 2005/0018773 A1 * | 1/2005 | Van Der Vleuten | 375/240.18 |
| 2005/0024487 A1 * | 2/2005 | Chen | 348/14.13 |
| 2005/0131660 A1 * | 6/2005 | Yadegar et al. | 703/2 |
| 2006/0050793 A1 * | 3/2006 | Wang et al. | 375/240.25 |
| 2006/0197839 A1 * | 9/2006 | Senior et al. | 348/169 |
| 2006/0215751 A1 * | 9/2006 | Reichel et al. | 375/240.03 |
| 2008/0304566 A1 * | 12/2008 | Yoon et al. | 375/240.12 |

FOREIGN PATENT DOCUMENTS

| | | |
|---|---|---|
| CN | 1666195 A | 9/2005 |
| EP | 1 862 010 A1 | 12/2007 |
| EP | 1 869 891 A1 | 12/2007 |
| EP | 1 929 781 A1 | 6/2008 |

(Continued)

OTHER PUBLICATIONS

Office Action for Chinese Patent Application 200780031433.1, Sep. 14, 2010.

(Continued)

*Primary Examiner* — Nathan Flynn
*Assistant Examiner* — Viral Lakhia
(74) *Attorney, Agent, or Firm* — Alston & Bird LLP (57) ABSTRACT

A method for signaling ROI scalability information in a file format. The present invention provides an efficient signaling of ROI scalability information in the file format, wherein the signaling comprises providing the geometrical information of a ROI and an indication to identify the ROI each coded data unit is associated with within a tier or layer.

23 Claims, 4 Drawing Sheets

FOREIGN PATENT DOCUMENTS

| WO | WO 03/047266 A1 | 6/2003 |
| WO | WO 2006/108917 A1 | 10/2006 |
| WO | WO 2006/112620 A1 | 10/2006 |
| WO | WO 2007/035065 A1 | 3/2007 |

OTHER PUBLICATIONS

English Translation of Office Action for Chinese Patent Application 200780031433.1, Sep. 14, 2010.

Wiegand et al, Overview of the H.264/AVC video coding system. IEEE Transactions on Circuits and Systems for Video Technology, 13(7): p. 560-576, Jul. 2003.

International Search Report for PCT Application No. PCT/IB2007/052605.

Office Action for Chinese Application No. 200780031433.1 dated Jan. 31, 2012.

Office Action for Chinese Application No. 200780031433.1 dated Aug. 8, 2012.

Search Report for European Application No. 07789878.1 dated May 21, 2012.

Office Action for European Application No. 07 789 878.1 dated Feb. 6, 2013.

* cited by examiner

SIGNALING OF REGION-OF-INTEREST SCALABILITY INFORMATION IN MEDIA FILES

FIELD OF THE INVENTION

The present invention relates generally to scalable video coding and decoding. More particularly, the present invention relates to the storage of a scalable data stream comprising region-of-interest (ROI) scalable layers.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include local playback services, streaming or on-demand services, conversational services and broadcast/multicast services. Technologies involved in multimedia applications include, among others, media coding, storage and transmission. Different standards have been specified for different technologies.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, there are currently efforts underway with regards to the development of new video coding standards. One such standard under development is the scalable video coding (SVC) standard, which will become the scalable extension to H.264/AVC.

Scalable video coding is a desirable feature for many multimedia applications and services used in systems employing decoders with a wide range of processing power, display size, connecting bandwidth, etc. Several types of video scalability have been proposed, such as temporal, spatial and quality scalability.

A portion of a scalable video bitstream can be extracted and decoded with a degraded playback visual quality. A scalable video bitstream contains a non-scalable base layer and one or more enhancement layers. An enhancement layer may enhance the temporal resolution (i.e., the frame rate), the spatial resolution, or simply the quality of the video content represented by a lower layer or part thereof.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). The concept of FGS was first introduced to the MPEG-4 Visual standard and is also part of the SVC standard. In contrast to FGS, coarse-grained scalability (CGS) refers to the scalability provided by a quality enhancement layer that does not provide fined-grained scalability.

The latest draft specification of the SVC is described in JVT-S202, "Joint Scalable Video Model JSVM-6: Joint Draft 6 with proposed changes," 19$^{th}$ Joint Video Team Meeting, Geneva, Switzerland, April 2006, incorporated herein by reference in its entirety.

SVC employs the mechanism already available in H.264/AVC for temporal scalability. This mechanism is known as a "hierarchical B pictures" coding structure. Therefore, the mechanism used in SVC is also fully supported by H.264/AVC, while signaling can be accomplished by using sub-sequence related supplemental enhancement information (SEI) messages.

For the mechanism that provides CGS scalability in the form of spatial and quality (SNR) scalability, a conventional layered coding technique is used. This technique is similar to techniques used in earlier standards with the exception of new inter-layer prediction methods. Data that could be inter-layer predicted includes intra texture, motion and residual data. Inter-layer motion prediction includes the prediction of block coding mode, header information, etc. In SVC, data can be predicted from layers other than the currently reconstructed layer or the next layer.

SVC includes a relatively new concept known as single-loop decoding. Single-loop decoding is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use the constrained intra prediction. In single-loop decoding, the decoder needs to perform motion compensation and full picture reconstruction only for the scalable layer desired for playback (referred to as the desired layer), thereby greatly reducing decoding complexity. All of the layers other than the desired layer do not need to be fully decoded because all or part of the data of the MBs not used for inter-layer prediction (whether it is inter-layer intra texture prediction, inter-layer motion prediction or inter-layer residual prediction) is not needed for reconstruction of the desired layer.

When compared to older video compression standards, SVC's spatial scalability has been generalized to enable the base layer to be a cropped and zoomed version of the enhancement layer. The quantization and entropy coding modules have also been adjusted to provide FGS capability. The FGS coding mode is referred to as progressive refinement, where successive refinements of the transform coefficients are encoded by repeatedly decreasing the quantization step size and applying a "cyclical" entropy coding akin to sub-bitplane coding.

The scalable layer structure in the current SVC draft is characterized by three variables. These variables are temporal_level, dependency_id and quality_level. The temporal_level variable is used to indicate the temporal scalability or frame rate. A layer comprising pictures of a smaller temporal_level value has a smaller frame rate than a layer comprising pictures of a larger temporal_level. The dependency_id variable is used to indicate the inter-layer coding dependency hierarchy. At any temporal location, a picture of a smaller dependency_id value may be used for inter-layer prediction for coding of a picture with a larger dependency_id value. The quality_level variable is used to indicate FGS layer hierarchy. At any temporal location, and with an identical dependency_id value, an FGS picture with a quality_level value equal to QL uses the FGS picture or base quality picture (i.e., the non-FGS picture when QL-1=0) with a quality_level value equal to QL-1 for inter-layer prediction.

The file format is an important element in the chain of multimedia content production, manipulation, transmission and consumption. There is a difference between the coding format and the file format. The coding format relates to the action of a specific coding algorithm that codes the content information into a bitstream. The file format refers to organizing the generated bitstream in such way that it can be accessed for local decoding and playback, transferred as a file, or streamed, all utilizing a variety of storage and transport architectures. Further, the file format can facilitate interchange and editing of the media. For example, many streaming applications require a pre-encoded bitstream on a server to be accompanied by metadata—stored in the "hint-tracks"—that assists the server to stream the video to the client. Examples for hint-track metadata include timing information, indication of synchronization points, and packetization hints. This information is used to reduce the operational load of the server and to maximize the end-user experience.

Available media file format standards include the ISO file format (ISO/IEC 14496-12), MPEG-4 file format (ISO/IEC 14496-14), AVC file format (ISO/IEC 14496-15) and 3GPP file format (3GPP TS 26.244). There is also a project in MPEG for development of the SVC file format, which will become an amendment to AVC file format.

The SVC file format is becoming an extension to AVC file format. A major problem to solve by the SVC file format is to efficiently handle the storage, extraction and scalability provisioning of the scalable video stream. A number of constraints are observed in the ongoing design phase. First, the size of the file containing a scalable bit stream should be as small as possible, while still allowing for lightweight extraction of NAL units belonging to different layers. This requires avoiding redundant storage of multiple representations of the media data and an efficient representation of metadata. Second, server implementation needs to be sufficiently lightweight, requiring not overly complex metadata design. Both of these two aspects are closely related to the metadata structuring, which consequently has received close attention during the standardization. There are two primary mechanisms to organize an SVC file. First, the grouping concept, i.e., the sample group structure in the ISO base media file format, can be used to indicate the relation of pictures and scalable layers. Second, several tracks referencing to subsets of the bitstream can be defined, each corresponding to a particular combination of scalability layers that form a playback point.

Figure 1:
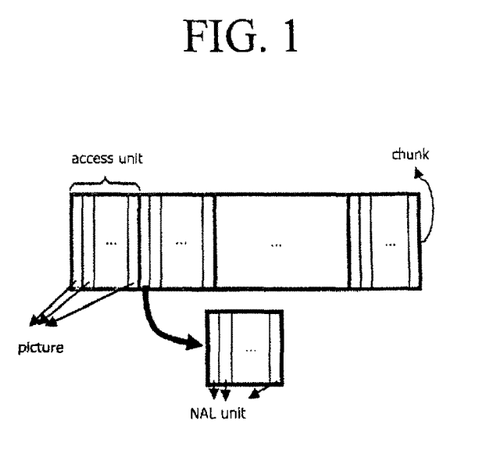
FIG. 1 is a representation showing how SVC media data is stored in a file.

FIG. 1 depicts how the SVC media data is stored in a file. Each access unit comprises one sample. A number of samples form a chunk. Practical content normally comprises many chunks. File readers typically read and process one chunk at a time. If the layering structure desired for playback does not require all of the access units (for temporal scalability) and/or all of the pictures in each required access unit (for other types of scalability), then the unwanted access units and/or pictures can be discarded. It is most efficient to perform a discarding operation at the picture level. However, because each sample comprises one access unit, a sample-level grouping is not optimal. On the other hand, if each picture were defined as one sample, then definition of each sample being the media data corresponding to a certain presentation time in the ISO base media file format would be broken.

In the latest draft SVC file format, the word 'tier' is used to describe a layer. Each NAL unit is associated with a group ID, and a number of group ID values are mapped to a tier, identified by a tier ID. This way, given a tier ID, the associated NAL units can be found. The scalability information, including bitrate, spatial resolution, frame rate, and so on, of each tier is signaled in the data structure ScalableTierEntry( ).

In SVC, region-of-interest (ROI) scalability is supported, i.e., the scalable stream could be encoded in a way that data of at least one rectangular sub-region, which is a subset of the entire region represented by a certain layer, can be independently decoded and displayed. Therefore, a user may request only the data for a ROI to be transmitted. Such a ROI is also referred to as a ROI scalable layer or scalable ROI layer.

One way to encode a ROI is to include the blocks covering a ROI into a set of one or more slices in the coded picture. When encoding the set of slices, the coded data is made independent of coded data of the blocks outside the corresponding ROI in any other coded picture. The set of slices may be included in a slice group that covers only the set of slices, or the set of slices may be included a slice group covering more slices.

Interactive ROI (IROI) scalability involves an interaction between the user/receiver and the sender. For example, in streaming of pre-encoded content, a user may freely request different regions for display. To enable this feature, the video content should be encoded into multiple rectangular ROIs. This way, only the coded data of all the ROIs covered by requested region are needed to be sent to the user.

To easily obtain the ROI scalability information and extract the required data for a client request, file format-level signaling of ROI information is needed. Without a file format signaling of the ROI information, a file reader has to find and parse the ROI related SEI messages (scalability information SEI messages, sub-picture scalable layer SEI messages, and motion-constrained slice group set SEI messages), and parse into the picture parameter sets and slice headers. Moreover, if the bitstream does not contain the ROI related SEI messages, the file reader has to assume that there is no ROI support in the bitstream or, alternatively, apply an extensively complex analysis to check whether there is ROI support and, if established that the bitstream does support, it has to apply a further extensively complex analysis to obtain the ROI information.

There is therefore a need to have a method for file format level signaling of ROI scalability information.

SUMMARY OF THE INVENTION

The present invention provides a method for signaling ROI scalability information in a file format. The present invention provides an efficient signaling of ROI scalability information in the file format, wherein the signaling comprises providing the geometrical information of a ROI and an indication to identify the ROI each coded data unit is associated with within a tier or layer.

The present invention can be implemented directly in software using any common programming language, e.g. C/C++, or assembly language. The present invention can also be implemented in hardware and used in a wide variety of consumer devices.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 2:
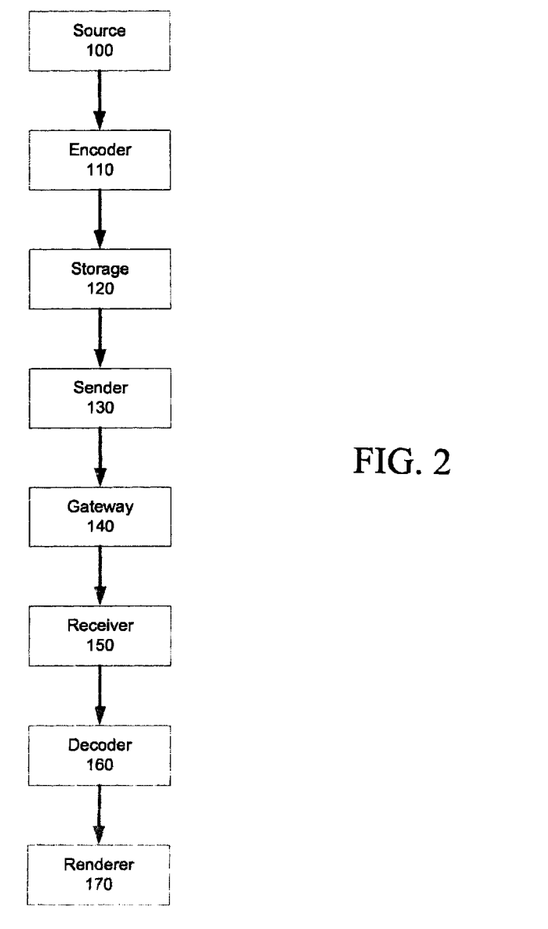
FIG. 2 shows a generic multimedia communications system for use with the present invention.

FIG. 2 shows a generic multimedia communications system for use with the present invention. As shown in FIG. 2, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file, which may be according to a file format. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file, which may be according to a file format. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should again be noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data streams according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

Alternatively, the coded media bitstream may be transferred from the sender 130 to the receiver 150 by other means, such as storing the coded media bitstream to a portable mass memory disk or device when the disk or device is connected to the sender 130 and then connecting the disk or device to the receiver 150.

The system includes one or more receivers 150, typically capable of receiving, de-modulating, and de-capsulating the transmitted signal into a coded media bitstream. De-capsulating may include the removal of data that receivers are incapable of decoding or that is not desired to be decoded. The coded media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

A receiver 150 may send a request to a sender 130 that it wants to receive coded data of only a subset of the region represented by a subset of the coded video bistream stored in a storage 120. In this case, the sender 130 fetches and sends the coded data required for the request according to the metadata included in the container file from the storage 120. The receiver 150 receives the data, which is further processed by a decoder 160, and finally the decoded video is displayed.

The present invention provides a method for signaling of ROI scalability information.

According to the present invention, the geometrical information of a ROI is signaled in the file format. The geometry information for a ROI comprises information representing the size and position of the ROI. Size information for the ROI may be represented in terms of number of pixels in width and height of the ROI. It may also be possible to represent the size in terms of blocks of pixels in width and height. For example, ROI size information may be represented according to macroblock units, wherein a macroblock unit represents 16×16 blocks of pixels of a video image. Position information may be relative to the position of another ROI or according to a pre-determined coordinate. Position information may be represented by an offset in horizontal and vertical directions to the associated relative position.

In one embodiment of the invention, the geometry information is signaled for each ROI separately. In another embodiment of the invention, an indication may be stored in the file format, wherein the indication indicates that all the ROIs are of identical width and height. It is further also possible to restrict that the indication indicates that all the ROIs, except possibly the right-most ROIs and the bottom-most ROIs, are of identical width and height. The same indication element may be used to signal if the geometry information is sent for each ROI or all the ROIs, with possible exceptions as described above, have the same geometry.

According to the present invention, an indication in the file format is provided to identify the ROI each coded data unit is associated with within a tier or layer.

One embodiment of the present invention, according to the changes to SVC file format presented below, is as follows: A ROI ID is signaled in the file format and identifies a ROI within a specific full picture based layer or tier. An ROI is identified by the layer or tier ID and the ROI ID. The ROI ID may be further linked to the address of the top-left block covered by the ROI. The ROIs belonging to a full picture base layer share the same the same layer or tier ID, and each ROI is associated with an ROI ID.

For signaling of the ROIs' geometry information, one embodiment of the present invention involves syntax changes to the SVC file format as follows. A new box, IroiInfoBox( ), is defined and is optionally included in ScalableTierEntry( ). The presence of IroiInfoBox( ) in a ScalableTierEntry( ) with a primary_definition equal to 1 indicates that the layer or tier is encoded into ROIs as indicated by the information contained in IroiInfoBox( ). The syntax for ScalableTierEntry( ) and the new IroiInfoBox( ) is as follows.

```
class ScalableTierEntry( ) extends VisualSampleGroupEntry ('scif') {
   unsigned int(8) groupId;
   unsigned int(8) tierId;
   unsigned int(5) reserved = 0;
   unsigned int(1) is_tier_IDR;
   unsigned int(1) primary_definition;
   unsigned int(1) is_key_picture;
   unsigned int(8) reserved = 0;
   if (primary_definition == 1)       // primary definition of tier
   {
      SVCDependencyDescriptionEntryBox( );        // Mandatory
                                                   Box
      SVCOperatingPointBox max_operating_point;   // mandatory
      SVCOperatingPointBox min_operating_point;   // mandatory
      //Optional Boxes or fields may follow when defined later
      RectRegionBox( );                           //
                                                   optional
      BufferingBox( );                            // optional
      TierDependencyBox( );                       // optional
      InitialParameterSetBox( );                  // optional
      IroiInfoBox( );              // optional
   } else {
      unsigned int(8) primary_group_ID;
   }
}
class IroiInfoBox extends Box('iroi'){
   unsigned int(1) iroi_type;
   unsigned int(7) reserved = 0;
   if(iroi_type == 0) {
      unsigned int(8) grid_roi_mb_width;
      unsigned int(8) grid_roi_mb_height;
   }
   else if(iroi_type == 1){
      unsigned int(32) num_roi;
      for(int i=0; i<= num_roi; i++) {
         unsigned int(32) top_left_mb;
         unsigned int(8) roi_mb_width;
         unsigned int(8) roi_mb_height;
      }
   }
}
``` iroi_type indicates the types of region division for all the ROIs. The value 0 indicates that all the ROIs (except possibly the right-most ROIs and the bottom-most ROIs) are of identical width and height. The value 1 indicates that the geometry information for each ROI is separately signaled.

grid_roi_mb_width and grid_roi_mb_height indicate the width and height, respectively, in units of macroblocks, of the ROIs. All the ROIs have identical width and height, with the following exceptions.

When (PicWidthInMbs % grid_roi_mb_width) is not equal to 0, the right-most ROIs have a width equal to (PicWidthInMbs % grid_roi_mb_width) macroblocks. When (PicHeightInMbs % grid_roi_mb_height) is not equal to 0, the bottom-most ROIs have a height equal to (PicHeightInMbs % grid_roi_mb_height) macroblocks. PicWidthInMbs and PicHeightInMbs are the visual width and height of the scalable layer or tier in units of macroblocks, respectively. (x % y) returns the remainder of x divided by y.

num_roi indicates the number of ROIs in a coded picture of the scalable layer or tier. top_left_mb specifies the macroblock address of the first macroblock in raster scan order in the ROI of the current entry. A macroblock address is the index of a macroblock in a macroblock raster scan of the picture starting with zero for the top-left macroblock in a picture. roi_mb_width and roi_mb_height indicate the width and height, respectively, in unit of macroblocks, of the ROI of the current entry.

A ROI ID, denoted as roi_id, is specified for each ROI in a scalable layer or tier. If iroi_type is equal to 0, roi_id is equal to the index of a ROI in a ROI raster scan of the picture starting with zero for the top-left ROI in a picture in the scalable layer or tier. Otherwise, roi_id is equal to the entry index i in the syntax of IroiInfoBox( ).

For signaling of the NAL-unit-to-ROI mapping information, each NAL unit needs to be linked to a tier ID value and a roi_id value. The current SVC file format design already allows for associating a tier ID value to each NAL unit. It is therefore still necessary to associate a roi_id value to each NAL unit. For this purpose, the timed metadata design the current SVC file format specification is utilized. The syntax for the data structure structured_metadata_packet( ) is changed to read as follows.

```
aligned(8) structured_metadata_packet(packetLength) {
   unsigned int i=5;
   bit(1) isAggregator;
   bit(1) isExtractor;
   bit(1) includesExtensionStructure;
   bit(1) isRoiNalu;
   unsigned int(4) reserved = 0;
   unsigned int(8) userField[4];
   if (includesExtensionStructure) {
      unsigned
         int((SVCMetadataSampleEntry.length_size_minus_one+1)*8)
            length;
      extensionStructure(length);
      i+=(SVCMetadataSampleEntry.length_size_minus_one+1)+length;
   }
   if (isAggregator || isExtractor) {
      while (i<packetLength) {
         unsigned
            int((SVCMetadataSampleEntry.lengthSizeMinusOne+1)*8)
               length;
         structured_metadata_packet(length);
         i+=(SVCMetadataSampleEntry.lengthSizeMinusOne+1)+length;
      }
   }
}
```

A isRoiNalu value equal to 1 indicates that the NAL unit corresponding to the current metadata packet belongs to a ROI. A isRoiNalu value equal to 0 indicates that the NAL unit corresponding to the current metadata packet does not belong to a ROI.

The parameters are set as follows.
metadata_encoding='iroi'
includeExtensionStructure=0

When isRoiNalu is equal to 1, the following applies. If isAggregator or isExtractor is equal to 1, then all of the NAL units contained or referenced by the aggregator or extractor NAL unit belong to the same ROI, and userField indicates the roi_id of the ROI. In this case, the value packetLength is set such that there is no embedded structured_metadata_packet( ) for the individual NAL units contained or referenced by the aggregator or extractor NAL unit. Otherwise (i.e., both isAggregator and isextractor are equal to 0), userField1 and userField2 indicate the least significant byte and most significant byte, respectively, of roi_id of the ROI to which the NAL unit corresponding to the current metadata packet belongs.

Another embodiment to signal the NAL-unit-to-tier mapping information (or the association of roi_id value to each NAL unit) is to define a new box in the sample table box. The syntax and semantics of the new box are as follows.

```
class NaluToRoiInfoBox extends Box('nroi'){
    for(unsigned int i=0; i<= entry_count1; i++) {
        unsigned int(16) entry_count2;
        for(unsigned int j=0; j<= entry_count2; i++)
            unsigned int(32) roi_id;
    }
}
``` entry_count1 is equal to the total number of samples in the media track. entry_count2 indicates the total number of NAL units in the sample.

Yet another embodiment to signal the NAL-unit-to-ROI mapping information (or the association of roi_id value to each NAL unit) is to define a new sample group. The sample group associates each sample to a group with the same number of NAL units and the same pattern of roi-id values. The sample group description entry is as follows.

```
class RoiIdEntry( ) extends VisualSampleGroupEntry ('roid') {
    unsigned int(16) entry_count;
    for(unsigned int i=0; i<= entry_count; i++) {
        unsigned int(32) roi_id;
    }
}
``` entry_count indicates the total number of NAL units in the sample that is a member of the group corresponding to the current group entry.

Figure 3:
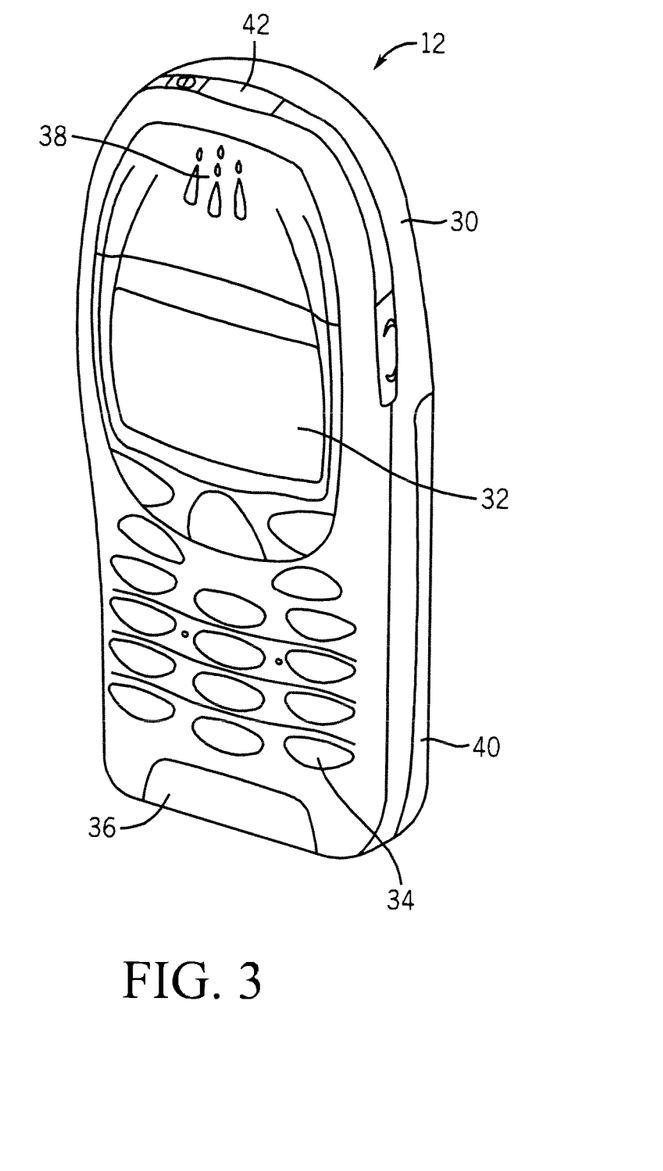
FIG. 3 is a perspective view of a mobile telephone that can be used in the implementation of the present invention.
Figure 4:
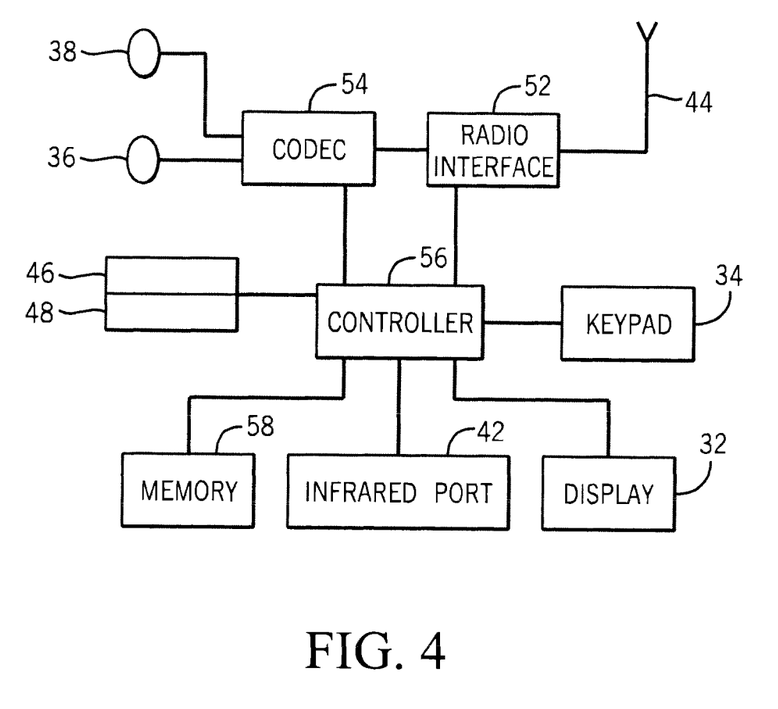
FIG. 4 is a schematic representation of the circuitry of the mobile telephone of FIG. 3.

FIGS. 3 and 4 show one representative mobile telephone 12 within which the present invention may be implemented. It should be understood, however, that the present invention is not intended to be limited to one particular type of mobile telephone 12 or other electronic device. Some or all of the features depicted in FIGS. 3 and 4 could be incorporated into any or all of the devices represented in FIG. 1.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
causing storage, with at least one processor, of a scalable video bitstream in a container file in at least one memory, the scalable video bitstream comprising at least one full picture-based scalable layer and at least one region-of-interest (ROI) scalable layer; identifying each ROI scalable layer by a first identifier and a second identifier, the first identifier identifying a full picture-based scalable layer to which the ROI belongs, and the second identifier identifying a ROI scalable layer within the full picture-based scalable layer; and indicating geometry information for the ROI scalable layer.

2. The method of claim 1, wherein the first identifier and the second identifier are stored in the container file.

3. The method of claim 2, wherein a geometry information derived from at least one of a position, shape and size of a ROI scalable layer is stored in the container file.

4. The method of claim 2, wherein the second identifier is derived from the position of a ROI scalable layer.

5. The method of claim 2, wherein the mapping of a coded data unit in the scalable video stream to a ROI scalable layer is stored in the container file.

6. The method of claim 2, wherein the file container is constructed according to the Scalable Video Coding (SVC) file format standard.

7. The method of claim 6, wherein the first identifier is signaled in a ScalableTierEntry( ) data structure.

8. The method of claim 7, wherein a geometry information derived from at least one of a position, shape and size of a ROI scalable layer is signaled in the ScalableTierEntry( ) data structure.

9. The method of claim 8, wherein the mapping of a coded data unit to the second identifier is signaled using a timed metadata.

10. The method of claim 8, wherein the mapping of a coded data unit to the second identifier is signaled in a box.

11. The method of claim 8, wherein the mapping of a coded data unit to the second identifier is signaled using a sample group.

12. A computer program product, comprising a non-transitory computer-readable storage medium and computer instructions stored therein, the computer program instructions comprising computer program instructions configured to: cause storing of a scalable video bitstream in a container file, the scalable video bitstream comprising at least one full picture-based scalable layer and at least one region-of-interest (ROI) scalable layer; identify each ROI scalable layer by a first identifier and a second identifier, the first identifier identifying a full picture-based scalable layer to which the ROI belongs, and the second identifier identifying a ROI scalable layer within the full picture-based scalable layer; and indicate geometry information for the ROI scalable layer.

13. An apparatus, comprising: a processor; and a memory communicatively connected to the processor and including computer program instructions, the memory and the computer program instructions being configured to, in cooperation with the processor, cause the apparatus to: cause storing of a scalable video bitstream in a container file, the scalable video bitstream comprising at least one full picture-based scalable layer and at least one region-of-interest (ROI) scalable layer; identify each ROI scalable layer by a first identifier and a second identifier, the first identifier identifying a full picture-based scalable layer to which the ROI belongs, and the second identifier identifying a ROI scalable layer within the full picture-based scalable layer; and indicate geometry information for the ROI scalable layer.

14. The apparatus of claim 13, wherein the first identifier and the second identifier are stored in the container file.

15. The apparatus of claim 14, wherein a geometry information derived from at least one of a position, shape and size of a ROI scalable layer is stored in the container file.

16. The apparatus of claim 14, wherein the second identifier is derived from the position of a ROI scalable layer.

17. The apparatus of claim 14, wherein the mapping of a coded data unit in the scalable video stream to a ROI scalable layer is stored in the container file.

18. The apparatus of claim 14, wherein the file container is constructed according to the Scalable Video Coding (SVC) file format standard.

19. The apparatus of claim 18, wherein the first identifier is signaled in a ScalableTierEntry( ) data structure.

20. The apparatus of claim 19, wherein a geometry information derived from at least one of a position, shape and size of a ROI scalable layer is signaled in the ScalableTierEntry( ) data structure.

21. The apparatus of claim 20, wherein the mapping of a coded data unit to the second identifier is signaled using a timed metadata.

22. The apparatus of claim 20, wherein the mapping of a coded data unit to the second identifier is signaled in a box.

23. The apparatus of claim 20, wherein the mapping of a coded data unit to the second identifier is signaled using a sample group.

* * * * *

UNITED STATES PATENT AND TRADEMARK OFFICE
CERTIFICATE OF CORRECTION

PATENT NO. : 8,442,109 B2  
APPLICATION NO. : 11/775136  
DATED : May 14, 2013  
INVENTOR(S) : Wang et al.

Page 1 of 1

It is certified that error appears in the above-identified patent and that said Letters Patent is hereby corrected as shown below:

<u>Title page,</u>
Item (60), Related U.S. Application Data, "Provisional application No. 60/860,539" should read --Provisional application No. 60/830,539--.

Signed and Sealed this
Fifteenth Day of October, 2013

Teresa Stanek Rea
*Deputy Director of the United States Patent and Trademark Office*